Nov. 8, 1960   D. A. AUGUSTIN   2,959,426
MULTIPLE RANGE CONTROL VALVE FOR AIR SPRING
Filed Oct. 21, 1958   2 Sheets-Sheet 1
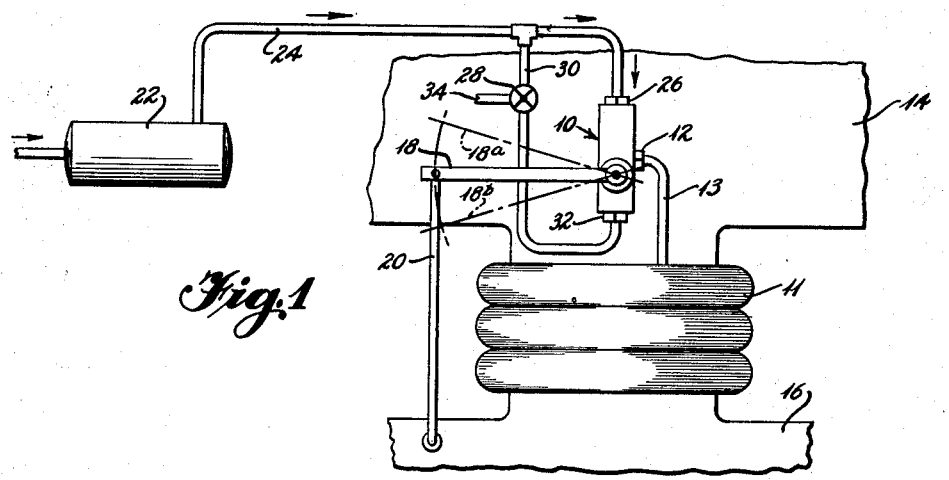
Fig.1
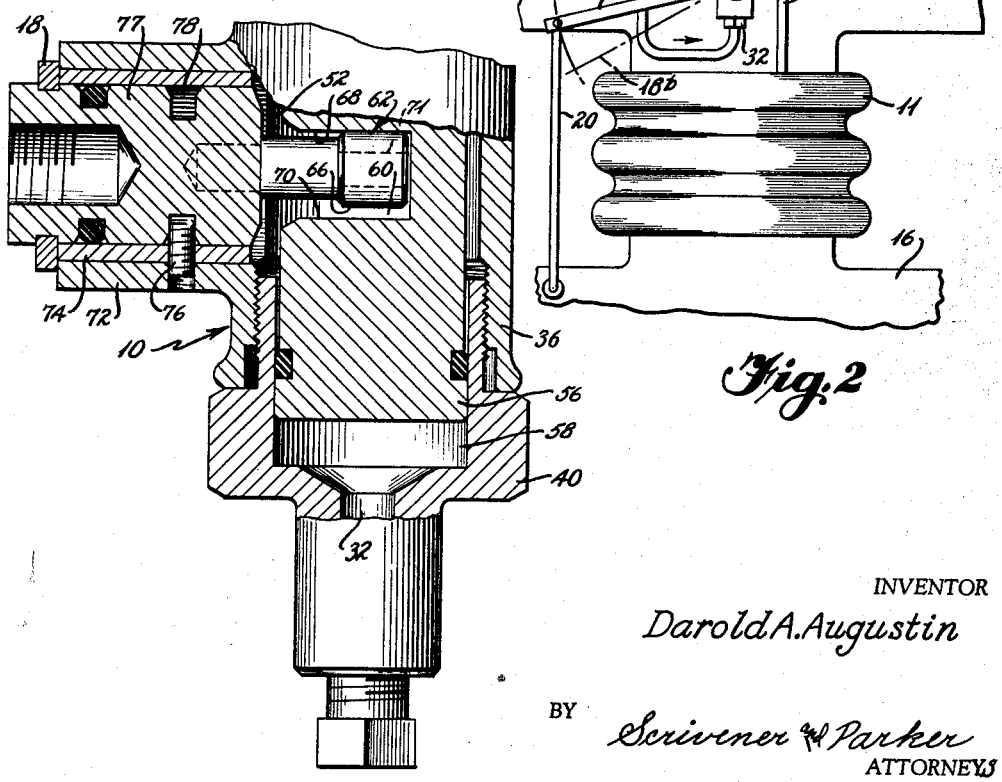
Fig.4
Fig.2
INVENTOR
Darold A. Augustin
BY
Scrivener & Parker
ATTORNEYS Nov. 8, 1960  D. A. AUGUSTIN  2,959,426
MULTIPLE RANGE CONTROL VALVE FOR AIR SPRING
Filed Oct. 21, 1958  2 Sheets-Sheet 2

INVENTOR
Darold A. Augustin
BY
Scrivener & Parker
ATTORNEYS

2,959,426

MULTIPLE RANGE CONTROL VALVE FOR AIR SPRING

Darold A. Augustin, Elyria, Ohio, assignor to Bendix-Westinghouse Automotive Air Brake Company, Elyria, Ohio, a corporation of Delaware Filed Oct. 21, 1958, Ser. No. 768,636

6 Claims. (Cl. 280—124)

This invention relates to motor vehicle air spring suspension systems and more particularly to an improved combined height control and leveling valve mechanism for such systems which enables the height of a vehicle frame above the axle to be established at one or more selected levels and also controls the leveling action of the vehicle frame at the selected level in response to change in load conditions.

Vehicle air spring suspension systems which utilize an air bag or bellows between the vehicle frame and axle have been chiefly concerned with maintaining the vehicle frame at one established level above the axle regardless of vehicle loading. The desirability of being able to raise the frame to a second established level has been recognized in that such action would enable the frame to clear high road crowns and other obstructions without "hanging-up" on the crowns or obstructions as is frequently the case with vehicles using either metallic springs or single-level air springs.

An object of the present invention therefore is to provide in combination with a vehicle air spring suspension system, means for selectively establishing the height of a vehicle frame above the axle at more than one level.

More specifically it is an object of the present invention to provide a control valve for a vehicle air spring suspension system which functions both to establish the desired level of the vehicle frame and also to maintain the established level regardless of changes in vehicle loading.

Other objects and their attendant advantages will become apparent as the following detailed description is read in conjunction with the accompanying drawings wherein:

Fig. 1 is a diagrammatic view of the control valve mechanism of the present invention associated with an air spring of conventional construction;

Fig. 2 is a view similar to Fig. 1 showing the air spring inflated to its second established level;

Fig. 4 is a broken vertical cross-sectional view taken substantially along the line 4—4 of Fig. 3.

Figure 3:
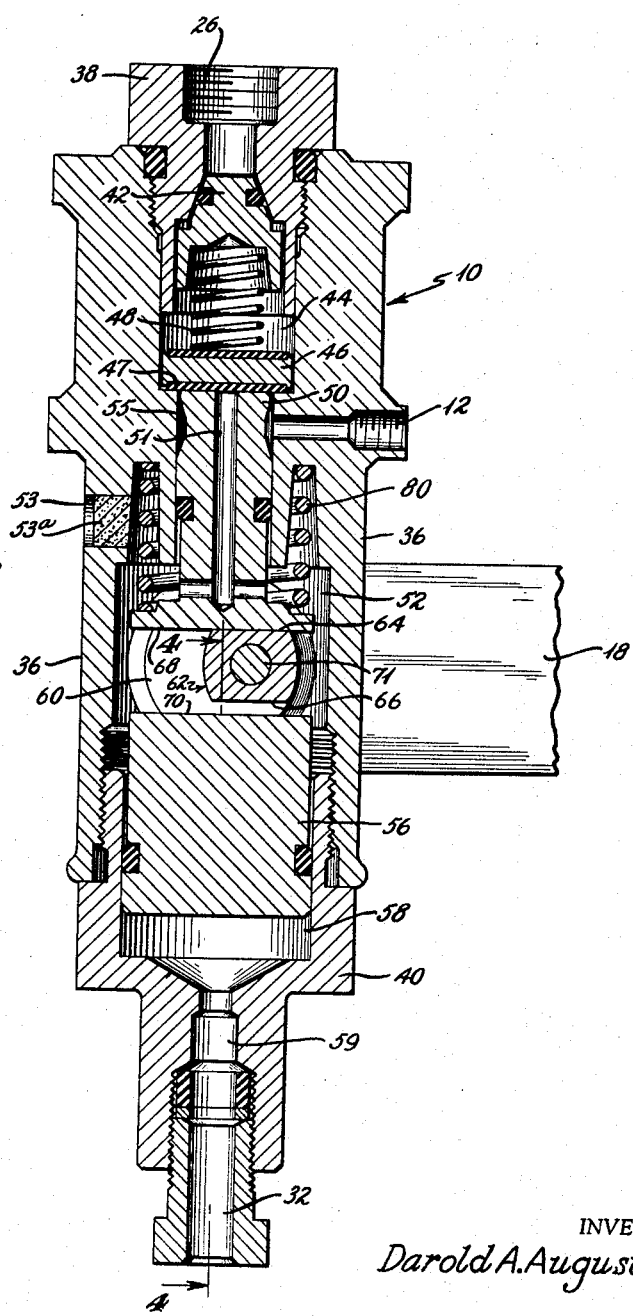
Fig. 3 is a vertical cross-sectional view of the control valve of the present invention.

Referring more particularly to Fig. 1, the novel control valve mechanism 10 of the present invention is illustrated therein in association with a conventional air spring or bellows 11 to which the valve is connected by a port 12 and a conduit 13. The valve mechanism 10 is mounted on a portion 14 of the vehicle frame with the air spring being interposed between the frame portion 14 and axle portion 16, operation of the valve being effected by oscillation of a control lever 18, the outer end of which is connected with the axle portion 16 by a link 20. It will be understood that the valve mechanism 10 may be used to control air springs on opposite sides of the vehicle or separate control valve mechanisms may be utilized for each air spring if desired.

As will become more fully apparent hereinafter, the valve 10 serves two functions, the first of which is to inflate or deflate the air springs to establish the level of the vehicle frame at one or the other of two selected levels, and the other of which is to maintain the selected level by admitting or exhausting air pressure to or from the air springs in accordance with changes in vehicle loading.

Air is supplied to the air spring for charging the same from a reservoir 22 which is connected by a conduit 24 to a port 26 at the upper end of the valve mechanism 10. In the normal level position of the air spring, as illustrated in Fig. 1, air is admitted to or exhausted from the spring 11 by means of a combined inlet and exhaust valve in the valve mechanism and later described in detail, which is controlled by the oscillation of the lever 18 on one side or the other of its full line neutral position in Fig. 1. The limits of lever oscillation are indicated in Figs. 1 and 2 by the dotted lines 18a and 18b and when the lever is moved in the direction of line 18a upon increased vehicle load, the valve mechanism is operated to admit pressure to the spring to raise the frame to the point where the lever is again in its neutral position. When the vehicle load is decreased the air spring 11 expands to lower lever 18 which then operates the valve mechanism to connect the spring to atmosphere and thus deflate the spring until the lever again returns to its neutral position.

In the high level position of the spring in Fig. 2, the lever 18 functions exactly as described in the foregoing paragraph except that now in its neutral position the lever is inclined with respect to the horizontal since the frame 14 and the valve mechanism have been elevated to the higher established level whereas the lever 18 and linkage 20 connecting the lever end to the axle have remained unchanged in length. Air pressure for inflating the spring to the second established high level is controlled by a three-way valve 28 in a branch conduit 30 which serves to connect the conduit 24 with a control port 32 at the lower end of the mechanism 10. When the valve 28 is in one position, it disconnects the supply conduit 24 from port 32 and connects the latter to atmosphere through an exhaust port 34 in the valve 28 thereby exhausting control pressure from the mechanism 10 so that only sufficient pressure is admitted to the air spring to inflate it to its first normal position of Fig. 1. However, when the valve 28 is moved to its second position, it disconnects port 32 from atmosphere while connecting the latter to supply conduit 24 thus admitting control pressure to mechanism 10 where, as will be later described in detail, the control pressure causes the aforementioned combined inlet and exhaust valve to be moved independently of lever 18 so as to admit pressure from reservoir 22 to air spring 11 to inflate the same, and raise the frame to its second high level at which point the combined inlet and exhaust valve is moved into a lapped position to be thereafter operated by the lever 18 exactly as it had been when the spring was in the normal position of Fig. 1.

Referring now to Fig. 3, the valve mechanism of the invention comprises a unitary casing 36 whose upper and lower ends are interiorly threaded to receive respectively cap means 38, 40 each of which is centrally apertured to provide the aforementioned ports 26, 32. The port 26 is connected through a one-way check valve 42 to an inlet cavity 44 containing at its lower end a combined inlet and exhaust valve member 46 which is urged towards its seated position on valve seat 47 by a spring 48 which also bears on the check valve 42 to urge this valve to its normal seated position.

The valve 46 is moved to unseated position away from seat 47 by the upward movement of a plunger 50 which contains a centrally drilled passageway 51 connected to an exhaust cavity 52 in casing 36 which in turn is connected to atmosphere through an exhaust port 53 containing a suitable filter 53a. When the plunger moves upwardly to unseat valve 46, the air spring which is connected to port 12, is connected by a slight clearance 55 around plunger 50, with the inlet pressure in cavity 44. When plunger 50 moves downwardly below seat 47, the valve 46 seats thereon to disconnect inlet pressure from port 12 while simultaneously the upper end of exhaust passage 51 is pulled away from valve 46 thus connecting the air spring with atmosphere through port 12, exhaust passage 51, exhaust cavity 52 and port 53. However, when the plunger moves upwardly or downwardly, as the case may be, to the point where it remains in contact with the valve 46, to effect a seal against exhaust pressure from the springs, and causes the valve 46 simultaneously to seal on its seat 47 to prevent supplying additional pressure to the springs the valve has assumed its level, neutral, or lapped position.

In accordance with the invention, the plunger 50 is an integral part of a piston member 56 sealingly and slideably received in a piston cavity 58 formed in the lower cap member 40 and connected by way of passage 59 and port 32 with the branch circuit 30. The intermediate portion of the piston member 56 extends into the exhaust cavity 52 and is provided with a transverse cam slot 60 adapted to receive a cam member 62 having flattened upper and lower sides 64, 66 respectively engageable with the upper and lower walls 68, 70 of the slot 60 in a manner later described. The cam member 62 is rockingly mounted on a pin 71 which is eccentrically secured to the inner end of a cam operating member 77 rotatably received in a laterally projecting sleeve 72 integral with the casing 36. The member 77 is supported in the sleeve 72 on a bearing 74 with both the bearing and the member being retained in place by a set screw 76 which projects into an annular groove 78 in the member 77. Fixed in any suitable manner to the outer end of member 77 is the inner end of lever 18 whose outer end is connected to the axle portion 16 of the vehicle by link 20 as previously explained.

With the parts of the invention in the position illustrated in Fig. 3, it will be observed that the upper wall 68 of slot 60 provides an abutment which is retained in engagement with the upper side 64 of the cam member 62 by means of a spring 80 bearing on the upper end of piston member 56. The cam member 62 is purposely made with a vertical thickness less than the width of slot 60 so that when the cam member is engaged by the upper wall 68 of the slot, a clearance exists beneath the lower side 66 of the cam member and the lower wall 70 of the slot. However, when reservoir pressure is admitted to cavity 58 by manipulation of the three-way valve 28 shown in Figs. 1 and 2, piston 56 is moved upwardly until the abutment formed by the lower wall 70 of slot 60 engages the lower side 66 of cam member 62. Upon this occurrence, as will become more fully apparent hereinafter, plunger 50 unseats supply-and-exhaust valve 46 to effect movement of the vehicle frame from its first low position to its second high position.

In operation with the parts of the valve mechanism in the position shown in Fig. 3, when the loading of the vehicle is increased the entire valve mechanism moves downwardly causing lever 18 to move counterclockwise in Fig. 3 thus causing cam member 62 to move piston 56 and plunger 50 upwardly to unseat combined inlet and exhaust valve 46 thereby connecting inlet cavity 44 with port 12 to admit air pressure to spring 11. Should the load in the vehicle have been decreased, the vehicle frame would then move upwardly causing lever 18 to rotate clockwise in Fig. 3 so that piston 58 would be moved downwardly by spring 80. As piston 56 moves downwardly the plunger 50 is withdrawn from valve 46 to connect the port 12 to atmosphere through the passage 51, exhaust chamber 52 and the exhaust port 53 in the side of the casing 36. As the pressure in spring 11 is either increased or relieved the frame 14 elevates or descends until the lever 18 is again in its neutral position at which point the valve 46 engages seat 47 and the upper end of passage 51 is sealed off so that the valve mechanism is lapped and no further air pressure can be admitted to or exhausted from the air spring until there is a further change in loading.

From the foregoing it will be observed that when the parts of the valve mechanism are in the position shown in Figs. 1 and 3 the mechanism operates similarly to a conventional air spring control valve which is responsive to vehicle loading to seat or unseat from an inlet or an exhaust passage, a combined inlet and exhaust valve, either to exhaust air from the air spring or to admit pressure to the spring in accordance with whether vehicle loading is decreased or increased thereby maintaining the vehicle frame at a preselected or established level.

When leveling action is desired at the normal level of Fig. 1 the three-way valve 28 is positioned to connect the control port 32 to atmosphere as explained above. However, should it be desired to move the entire frame upwardly to its second or high position, the vehicle operator turns the valve 28 to shut off the exhaust 34 and connect the control port 32 to reservoir pressure. Upon this occurrence fluid pressure flows through port 32 to piston chamber 58 to cause piston 56 to move from the position of the drawing to a position where the lower side 70 of slot 60 engages the lower side 66 of cam member 62 and the plunger unseats supply-and-exhaust valve 46 as previously explained. Upon this occurrence, the air spring 11 is connected with the pressure in inlet cavity 44 by way of port 12 and the spring commences to inflate and raise the frame 14 and hence the entire valve assembly upwardly with respect to the axle 16. As the valve moves upwardly the end of lever 18 which is connected to the valve also raises so that, relative to the valve casing 36, there is imparted to the lever a clockwise movement in Fig. 3 which causes cam member 62 to act on lower surface 70 of slot 60 to move piston 56 downwardly with respect to casing 36 as it moves upwardly and this action continues until supply-and-exhaust valve 46 engages seat 47 to cut off the supply of air to the springs at which point the valve 46 laps and the frame is retained in its second high elevel position with the lever 18 in the downwardly sloping neutral position of Fig. 2. Thereafter, as the load in the vehicle changes, the lever 18 is moved by link 20 about its second neutral position to operate plunger 50 and supply-and-exhaust valve 46 exactly as described for the situation where the lever is in its first neutral position of Fig. 1.

When the piston 56 is in its second raised position it will be observed that spring 80 is merely compressed and performs no function. However, the pressure trapped in piston cavity 58 now functions as a spring to retain the bottom 70 of slot 60 in engagement with the lower surface 66 of cam member 62. When it is desired to lower the frame to its first normal position of Fig. 1, valve 28 is turned by the operator to connect control port 32 to atmosphere so that spring 80 immediately moves the upper surface 68 of slot 60 into engagement with the upper side 64 of cam member 62 thus withdrawing plunger 50 downwardly clear of valve 46 so as to connect the air spring 11 to atmosphere via port 12, passage 51 and exhaust port 53. The air springs then deflate to lower the frame 14 until the valve 46 again laps in the lower neutral position of Fig. 1.

From the foregoing, it will be apparent that the height to which the vehicle may be raised is a function of the spacing between the lower surfaces 66, 70 of the cam member and slot 60 and that the wider the gap the greater will be the height to which the frame may be raised with respect to the axle.

It will be apparent to those skilled in the art that the present invention is susceptible of various changes and modifications without, however, departing from the scope and spirit of the appended claims.

What is claimed is:

1. Control valve mechanism for regulating the air pressure within a vehicle air spring for selectively establishing the height of a vehicle frame above the axle at one of two levels and for maintaining the vehicle frame at said selected height regardless of vehicle loading comprising a valve casing mounted on the frame, valve means within the casing for controlling the flow of compressed air to or from the air spring, said casing having a control port adapted to be supplied with fluid pressure or connected to atmosphere, a pressure responsive member in said casing operatively connected to said valve means and adapted to be moved between two positions for controlling said valve means in response to the flow of fluid pressure to or from said control port, cam means in said casing responsive to relative movement between the frame and axle, and means for operatively connecting said pressure responsive member with said cam means when said member has moved to either of its two positions whereby said pressure responsive member is operative by said cam means to control said valve means in response to relative movement between said frame and axle.

2. Control valve mechanism for regulating the air pressure within a vehicle air spring for selectively establishing the height of a vehicle frame above the axle at one of two levels and for maintaining the vehicle frame at said selected height regardless of vehicle loading comprising a valve casing mounted on the frame, valve means within the casing for controlling the flow of compressed air to or from the air spring, said casing having a control port adapted to be supplied with fluid pressure or connected to atmosphere, a pressure responsive member in said casing operatively connected to said valve means and adapted to be moved between two positions for controlling said valve means in response to the flow of fluid pressure to or from said control port, spaced abutments connected to said pressure responsive member, and cam means in said casing responsive to relative movement between the frame and axle and engageable with one or the other of said abutments when said member has moved to one or the other of its two positions in response to the pressure at said control port, said cam means operating said pressure responsive member and valve means in response to relative movement between said frame and axle.

3. Control valve mechanism for regulating the air pressure within a vehicle air spring for selectively establishing the height of a vehicle frame above the axle at one of two levels and for maintaining the vehicle frame at said selected height regardless of vehicle loading comprising a valve casing mounted on the frame, valve means within the casing for controlling the flow of compressed air to or from the air spring, said casing having a control port adapted to be supplied with fluid pressure or connected to atmosphere, a piston in said casing operatively connectable with said valve means and adapted to be moved between two positions for controlling said valve means in response to the flow of fluid pressure to or from said control port, a pair of spaced abutments connected to said piston, and cam means in said casing responsive to relative movement between the frame and axle and engageable with one or the other of said abutments in accordance with the position of said member to operate said member and said valve means in response to relative movement between said frame and axle.

4. The control valve mechanism in accordance with claim 3 wherein said cam means is disposed between said abutments and afford stop means for said abutments to limit the movement of said piston in response to the fluid pressure at said control port.

5. The control valve mechanism in accordance with claim 3 wherein said abutments comprise the side walls of a transverse slot in a part of said piston and wherein said cam means comprises a member projecting into said slot and movable in opposite directions toward and away from said side walls of said slot in response to relative movement between said frame and axle, the distance between the side walls of said slot being greater than the corresponding width of said cam member to enable said piston to move relative to said cam member in response to the fluid pressure at said control port.

6. Control valve mechanism for regulating the air pressure within a vehicle air spring for selectively establishing the height of a vehicle frame above the axle at one of two levels and for maintaining the vehicle frame at said selected height regardless of vehicle loading, comprising a valve casing mounted on the frame, valve means within the casing for controlling the flow of compressed air to or from the air spring, a member in said casing operatively connected to said valve means and movable to one of two positions for controlling said valve means, said member being provided with a pair of spaced-apart abutments, cam means positioned between said abutments and responsive to relative movement between the frame and axle, resilient means for moving said member in one direction to bring one of said abutments into engagement with said cam means and to move the other of said abutments out of engagement with said cam means, and means to subject said member to fluid pressure to move the latter in the opposite direction to bring the other of said abutments into engagement with said cam means and to move said one abutment out of engagement with said cam means, the latter operating said member and valve means in response to relative movement between the frame and axle irrespective of which abutment is engaged therewith.

References Cited in the file of this patent

UNITED STATES PATENTS 2,429,658    Young _____ Oct. 28, 1947